INVENTORS
William Edward Hobbs
and
William James Rowley Clark
BY Baldwin & Wight
ATTORNEYS INVENTORS
William Edward Hobbs
and
William James Rowley Clark
BY Baldwin & Wight
ATTORNEYS United States Patent Office 3,449,509
Patented June 10, 1969

3,449,509

COLOUR TELEVISION SYSTEMS INCLUDING A HIGH RESOLUTION LUMINANCE CAMERA AND A PLURALITY OF LOWER RESOLUTION COLOUR CAMERAS

William Edward Hobbs, Chelmsford, and William James Rowley Clark, Great Baddow, England, assignors to The Marconi Company Limited, London, England, a British company Filed Apr. 29, 1966, Ser. No. 546,248
Claims priority, application Great Britain, Aug. 9, 1965, 33,992/65
Int. Cl. H04n 1/46, 9/02
U.S. Cl. 178—5.2 14 Claims

ABSTRACT OF THE DISCLOSURE

Colour television systems wherein red, green and blue component colour camera tubes and a luminance camera tube are provided to view the object of transmission. The component colour camera tubes are of low resolution (e.g., Vidicons), while the luminance camera tube is of high resolution (e.g., an image orthicon) and scanning in the luminance tube is at a higher number of lines per field than in the colour tubes. At the receiver, red, green and blue colour component images derived from the signals produced by the colour tubes and a monochrome image derived from signals produced by the luminance tube are superimposed. In preferred embodiments, signals from the luminance tube are passed through a circuit including a differential amplifier to one input of which luminance signals are applied directly and to the other input of which luminance signals are applied via amplitude adjusting means and a low-pass filter passing the lower frequency portion of the luminance signal.

Figure 1:
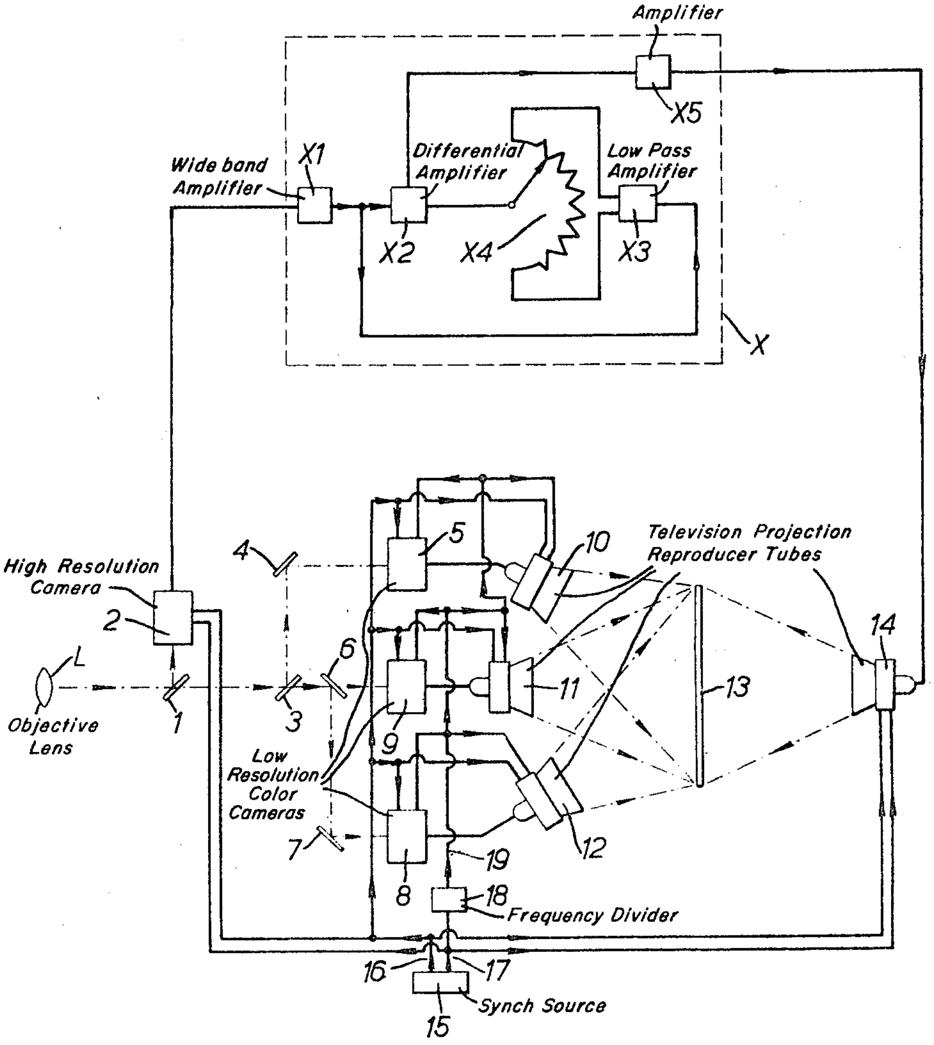

This invention relates to colour television systems and, though not theoretically limited to its application thereto, is primarily intended for closed circuit colour television systems.

There are many applications of closed circuit colour television in which high resolution in the finally reproduced coloured picture is required. Examples of this are so-called visual flight simulators and missile simulators. Normal present day practice in such cases is essentially the same as in television broadcast practice, i.e., it consists in using a number of cameras operating in synchronism and all to the same television standard as regards number of fields per second and number of lines per field in that all the cameras operate at the same scanning rate. The cameras providing the colour information—there are usually three for red, green and blue respectively—are normally of the Vidicon type. They may be, for example, the tubes known under the registered British trademark "Plumbicon." This practice is satisfactory so long as the requirements as respects resolution are not to onerous but when higher resolution is required and it is sought to meet this requirement by increasing the scanning rate, a limit set by the colour cameras themselves is soon reached. Indeed in many applications of closed circuit colour television, the colour cameras in the known systems are already operated so near to their limit of performance that the obtaining of increased resolution by increasing the scanning rate appears quite impractical. Moreover, when the colour cameras are operated at a high scanning rate, camera noise in the colour cameras becomes large and presents a serious problem. The present invention seeks to overcome this difficulty.

According to this invention in its broadest aspect a reproduced colour television picture is obtained by combining pictures obtained by means including at least two low resolution colour cameras scanning at the same predetermined rate and at least one high resolution luminance camera scanning at a substantially higher rate.

According to a feature of this invention a colour television system comprises a plurality of low resolution component colour camera tubes and a high resolution luminance camera tube all said camera tubes being arranged to operate at the same field frequency but the luminance camera tube being arranged to operate at a number of lines per field which is substantially larger than the number of lines per field at which the colour camera tubes are arranged to operate.

In a preferred embodiment of the invention a closed circuit colour television system comprises three component colour camera tubes respectively for red, green and blue, a luminance camera tube, three colour reproducer tubes respectively fed with signals derived from the red, green and blue camera tubes, a monochrome reproducer tube fed with signals derived from the luminance camera tube, a source of field synchronising signals connected to synchronise field deflection in all the camera and reproducer tubes, a source of line synchronising signals interlocked with the field synchronising signal source, and connected to synchronise line deflection in the luminance camera tube and in the monochrome reproducer tube, means for deriving further line synchronising signals at a fraction of the frequency of the aforesaid line synchronising signals, means for utilising said further line synchronising signals to synchronise line deflection in the colour camera tubes and the colour reproducer tubes and means for combining the pictures reproduced by all the reproducer tubes to constitute a coloured picture for viewing. Preferably the reproducer tubes are projector tubes projecting on to a common viewing surface to produce the picture for viewing.

Preferably the number of lines per field of the luminance camera tube is an odd multiple of the number of lines per field of the colour camera tubes. Preferably the odd multiple is three.

Preferably the output signals from the luminance camera tube are fed, before utilisation, to an adjustable circuit adapted to adjust the lower frequency portion of its response-frequency curve. Such a circuit may comprise a differential amplifier having one of its inputs fed directly from the luminance camera tube and its other input fed from said luminance camera tube through a channel including amplitude adjusting means and a low-pass filter adapted to pass the lower frequency portion of the luminance camera tube output, output for utilisation being taken from the differential amplifier.

Preferably the luminance camera tube is an image orthicon camera and the colour camera tubes are of the Vidicon type preferably tubes known under the registered trademark "Plumbicon."

It will be seen that, in the preferred embodiments of this invention the higher resolution is obtained by a high resolution luminance camera tube and the colouring information (with, of course, low resolution luminance information) is obtained by low resolution colour camera tubes which scan at a significantly lower rate than the luminance camera tube. The result of this combination of low resolution colour camera tubes operating at a low scanning rate with a high resolution luminance camera tube operating at a higher scanning rate is to produce a high resolution picture of significantly better signal/noise ratio than would be achieved by a conventional four-camera tube system (one luminance camera tube and three colour camera tubes) all operating at the same scanning rate. This may be shown from the following, for the case (for example) of a 2:1 interlaced system:

The bandwidth B is related to the active scanning line duration T and the limiting horizontal resolution $R_L$ in lines picture height by the relation $$B \propto \frac{R_L}{T}$$

Therefore, for a specified limiting resolution in the colour channel $$B \propto \frac{1}{T}$$

The area $N_A$ under the approximately triangular noise spectrum obtained from a Vidicon type of tube is proportional to the square of the bandwith, i.e., $N_A \propto B^2$ or $B \propto N_A$. Therefore $$\sqrt{N_A} \propto B \propto \frac{1}{T}$$

and $$N_A \propto \frac{1}{T^2}$$

Therefore any increase in the active scanning time in the low resolution colour channel will result in a large reduction in camera noise and this the invention accomplishes by using a significantly lower scanning rate in the colour channel than in the luminance channel providing the high resolution.

Figure 2:
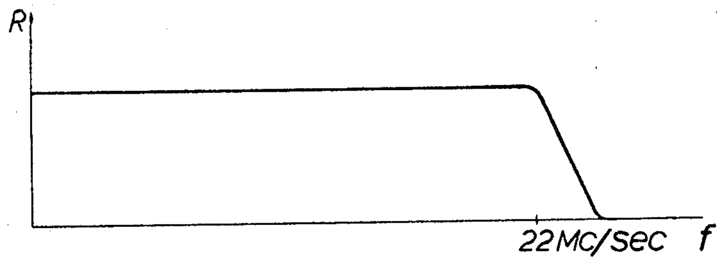
Figure 3:
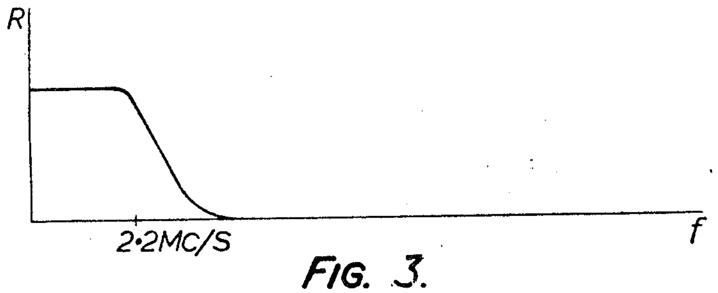
Figure 4:
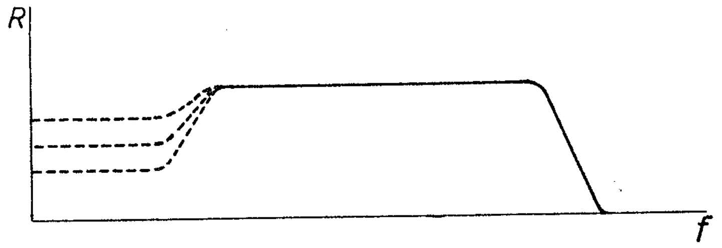

The invention is illustrated in and further explained in connection with the accompanying drawings in which FIGURE 1 is a highly simplified schematic block diagram of one embodiment of the invention and FIGURES 2, 3 and 4 are explanatory graphical figures.

Referring to FIGURE 1 a subject (not shown) to be televised is viewed by an objective lens system represented diagrammatically at L and focussed via reflection at a semisilvered mirror 1 upon a high resolution television camera unit 2 preferably one comprising an image orthicon tube, light passing through the mirror 1 falls upon a partly reflecting dichroic mirror 3 which separates the red light and reflects it via a mirror 4 to a low definition colour camera 5 for red light. Light passing through the dichroic mirror 3 falls upon a further partly reflecting dichroic mirror 6 which separates the blue light and reflects it via a mirror 7 to another similar low definition colour camera 8 for blue light. The green light passing through the mirror 6 falls upon a third low definition camera 9 for green light. The three low definition cameras 5, 9 and 8 may include, for example, Vidicon type tubes such as those known under the registered British trademark "Plumbicon" and their outputs are fed respectively to red, green and blue television projection reproducer tubes 10, 11, 12 which project upon an image viewing screen 13. Output from the high resolution television camera 2 is a luminance signal output and is reproduced by a television projection reproducer tube 14. As shown the three colour reproducer tubes 10, 11 and 12 project upon one side of the viewing screen 13, and the monochrome tube 14 projects upon the other side of the screen but this arrangement is shown only because of simplicity of drawing and any other means (not shown), may be used for superimposing the images reproduced by the four reproducer tubes and viewing the resultant combined image.

In FIGURE 1 the channel between the camera 2 and the tube 14 includes interposed apparatus within the broken line block X but this apparatus, which will be described later herein, is optional, though preferred. No attempt is made in FIGURE 1 to show optical equipment in any detail and lenses (not shown) may be interposed in the various individual light paths as necessary. Similarly amplifiers and shaping circuits (not shown) may be provided in the various individual electrical circuits as necessary.

A master synchronising source 15 serves to synchronise all the cameras and tubes. The field frequency is the same for all the camera tubes and is supplied to their field deflection systems via the branched circuit fed from the field output lead 16 of the source 15. The line synchronising output lead 17 from the said source 15 supplies line synchronising signals at a relatively high frequency via the branched circuit shown to the line deflection systems of the high definition luminance camera 2 and the monochrome tube 14. This relatively high frequency is reduced by a required division factor by a frequency divider 18, e.g., a frequency dividing gate circuit, the reduced frequency from which is supplied over lead 19 and the branched circuit fed thereby to the line deflection systems of the colour cameras and tubes 5, 9 and 8 and 10, 11, 12.

Although the invention is not limited to the use of any particular different television standards for the high and low definition parts of the system, practical and satisfactory figures are given in the table below for an interlaced installation in which the number of lines per picture is 405 in the colour cameras and tubes and three times that figure (i.e., 1215) in the luminance camera and monochrome tube, the division factor of the divider 18 being, therefore, 3, although, of course, other factors can be adopted.

| Parameter | 405 line cameras and tubes | 1215 line cameras and tubes | Remarks |
|---|---|---|---|
| Field frequency | 50 c./sec | 50 c./sec | |
| Field blanking | 14 H (1.38 msec.) | 42 H (1.38 msec.) | |
| Line blanking | 18 μsec | 10 μsec | Arbitrary choice. |
| Line frequency | 10.125 kc./see | 30.375 kc./sec | |
| Line period (H) | 98.8 μsec | 33 μsec | |
| Active line period | 80 μsec | 23 μsec | |
| Active lines per picture | 377 | 1,131 | |
| Vertical resolution | 264 lines/height | 792 lines/height | Kell Factor .7. For equal vertical and horizontal resolution. |
| Horizontal resolution | 264 lines/height | 792 lines/height | |
| Do | 350 lines/width | 1,050 lines/width | |
| Bandwidth | 2.2 mc./sec | 22.5 mc./sec. | |

The Kell factor is the ratio of the number of resolvable lines in the raster to the actual number of active lines, i.e., lines not occurring during blanking periods.

As regards the ratio of the number of lines adopted for the high definition luminance camera tube and monochrome tube to the number of lines adopted for the low definition colour camera tube it is much preferred, in the interests of simplification, to make this an odd integer—in the example above given, 3. It is, however, possible to adopt an even integer relationship, e.g., 2 or 4, but this is not preferred because, in order to produce equally satisfactory results in an interlaced system, added complexity in the synchronising equipment would be necessary to apply odd frame timing correction during the field blanking interval of the high resolution channel to effect interlace during the active scan period. It is indeed theoretically possible to adopt a nonintegral relationship if provision is made to prevent the generation of shifting or flickering interference patterns in the finally reproduced picture but, in normal cases, there is nothing to be gained by departing from the preferred odd-integer relationship with its advantages of good results without added complexity.

Referring again to FIGURE 1 it will now be seen that the composite coloured picture reproduced on the screen 13 will be composed of a high resolution luminance component, a low resolution chrominance or "colouring" component, and a low resolution luminance component, the high scan rate luminance component in effect providing the fine detail in the composite picture and effectively desaturating the red-green-blue colour picture, the luminance contrast range being unaffected by this process.

The system is obviously incapable of reproducing highly saturated colours but in many practical cases—for example where the invention is to be used in a visual flight simulator—such colours are not encountered. In the past, in connection with visual flight simulators, considerable effort has been directed towards producing so-called terrain models which have high reflectors without unnaturally high colour saturation. A very useful practical advantage of a system in accordance with this invention is that it lends itself to the provision, where required, of adjustment of colour saturation to suit the viewer, i.e., to the provision of what may be termed subjective adjustment of colour saturation. The apparatus within block X of FIGURE 1 illustrates one simple means for providing such subjective adjustments.

FIGURE 2 is a typical "idealised" response frequency (R, *f*) curve associated with the high resolution luminance part of the system of FIGURE 1, i.e., the monochrome part of the system, assuming the apparatus in block X to be bypassed. FIGURE 3 is a corresponding "idealised" response-frequency curve associated with the low resolution chrominance part of the system. Subjective adjustment of colour saturation can be effected by controllably adjusting the response of the high resolution luminance part of the system over the lower frequency part of the curve of FIGURE 2 as shown in FIGURE 4 the three broken line portions of which, in conjunction with the full line portion, show the results obtained with three different settings of the adjustment. The apparatus in block X of FIGURE 1 enables such adjustments to be made. Referring again to FIGURE 1 output from the camera 2 is fed to a wide band amplifier X1 which provides one input to a differential amplifier X2. The output from X1 is also fed to a low pass amplifier X3 having its upper cutoff approximately at the frequency below which the required resolution in the final picture on the screen 13 is obtainable from the colour tubes at 5, 9 and 8 alone. The output from the low pass amplifier X3 appears across the potentiometer resistance X4 the adjustable slider on which provides the second input to the differential amplifier X2. The output from X2 is fed via the amplifier X5 to the tube 14. The response-frequency curve associated with the high resolution part of the system will accordingly be a curve of the nature of those shown in FIGURE 4, the actual curve depending on the adjustment of the slider of the potentiometer which will therefore adjust the colour saturation in the finally reproduced picture on the screen 13.

We claim:

1. A colour television system for providing a reproduced colour television picture, including at least two low resolution colour cameras scanning at the same predetermined rate and at least one high resolution luminance camera scanning at a substantially high rate than said predetermined rate and means for combining pictures obtained by said colour and luminance cameras.

2. A colour television system comprising a plurality of low resolution component color camera tubes and a high resolution luminance camera tube, means for operating all said camera tubes at the same field frequency and means for operating said luminance camera tube at a number of lines per field which is substantially larger than the number of lines per field at which the colour camera tubes operate.

3. A closed circuit colour television system comprising comprising three component colour camera tubes, respectively for red, green and blue, a luminance camera tube, three colour reproducer tubes, means for feeding the three colour reproducer tubes, respectively, with signals derived from the red, green and blue camera tubes, a monochrome reproducer tube, means for feeding the monochrome reproducer tube with signals derived from the luminance camera tube, a source of field synchronising signals connected to synchronise field deflection in all the camera and reproducer tubes, a source of line synchronising signals interlocked with the field synchronising signal source, and connected to synchronise line deflection in the luminance camera tube and in the monochrome reproducer tube, means for deriving further line synchronising signals at a fraction of the frequency of the aforesaid line synchronising signals, means for utilising said further line synchronising signals to synchronise line deflection in the colour camera tubes and the colour reproducer tubes and means for combining the pictures reproduced by all the reproducer tubes to constitute a coloured picture for viewing.

4. A system as claimed in claim 3 wherein said reproducer tubes comprise projector tubes projecting on to a common viewing surface to produce the picture for viewing.

5. A system as claimed in claim 1, including means for providing a number of lines per field of the luminance camera which is an odd multiple of the number of lines per field of the color camera tubes.

6. A system as claimed in claim 5 wherein said means for providing a number of lines comprises means for providing in the luminance camera three times the number of lines per field of the colour camera tubes.

7. A system as claimed in claim 1, including adjustable circuit means including means for adjusting the lower frequency portion of the response-frequency curve of said adjustable circuit means and means for feeding the output signals from said luminance camera tube, before utilisation, to said adjustable circuit means.

8. A system as claimed in claim 7 wherein the said adjustable circuit means comprises a differential amplifier, means for feeding one of the inputs of said differential amplifier directly from the luminance camera tube, channel means for feeding another input of said differential amplifier from said luminance camera tube including amplitude adjusting means and a low pass filter adapted to pass the lower frequency portion of the luminance camera tube output, and means for taking output for utilisation from the differential amplifier.

9. A system as claimed in claim 2, including means for providing a number of lines per field of the luminance camera which is an odd multiple of the number of lines per field of the colour camera tubes.

10. A system as claimed in claim 2, including adjustable circuit means including means for adjusting the lower frequency portion of the response-frequency curve of said adjustable circuit means, and means for feeding the output signals from said luminance camera tube, before utilisation, to said adjustable circuit means.

11. A system as claimed in claim 10 wherein the said adjustable circuit means comprises a differential amplifier, means for feeding one of the inputs of said differential amplifier directly from the luminance camera tube, channel means for feeding another input of said differential amplifier from said luminance camera tube including amplitude adjusting means and a low pass filter adapted to pass the lower frequency portion of the luminance camera tube output, and means for taking output for utilisation from the differential amplifier.

12. A system as claimed in claim 3, including means for providing a number of lines per field of the luminance camera which is an odd multiple of the number of lines per field of the colour camera tubes.

13. A system as claimed in claim 3, including adjustable circuit means including means for adjusting the lower frequency portion of its response-frequency curve, and means for feeding the output signals from said luminance camera tube, before utilisation, to said adjustable circuit means.

14. A system as claimed in claim 13 wherein the said adjustable circuit means comprises a differential amplifier, means for feeding one of the inputs of said differential amplifier directly from the luminance camera tube, channel means for feeding another input of said differential amplifier from said luminance camera tube including amplitude adjusting means and a lower pass filter adapted to pass the lower frequency portion of the luminance camera tube output, and means for taking output for utilisation from the differential amplifier.

References Cited

UNITED STATES PATENTS

| | | | |
|---|---|---|---|
| 3,275,742 | 9/1966 | Quinton et al. | 178—5.2 |
| 3,303,272 | 2/1967 | Gargini | 178—5.2 |

RICHARD MURRAY, *Primary Examiner.*

JOHN MARTIN, *Assistant Examiner.*